United States Patent [19]

Tomoda et al.

[11] Patent Number: 5,008,875

[45] Date of Patent: Apr. 16, 1991

[54] OPTICAL DISC REPRODUCING APPARATUS HAVING DISPLAY INDICATING PROGRAM STATUS

[75] Inventors: Haruhisa Tomoda, Kashihara; Yasuomi Shimada, Ikoma, both of Japan

[73] Assignee: Matsushita Electric Industrial Co., Ltd., Osaka, Japan

[21] Appl. No.: 241,235

[22] Filed: Sep. 7, 1988

[30] Foreign Application Priority Data

Sep. 8, 1987 [JP] Japan ................ 62-224341

[51] Int. Cl.⁵ .................... G11B 7/28; G11B 27/02
[52] U.S. Cl. ................................................ 369/85
[58] Field of Search ............... 360/15, 72.2, 14.1, 360/14.2, 14.3, 13; 369/32, 47, 48, 49, 50, 84, 85, 83; 358/335, 342

[56] References Cited

U.S. PATENT DOCUMENTS

| | | |
|---|---|---|
| 4,280,159 | 7/1981 | Nakayama . |
| 4,307,418 | 12/1981 | Mindel et al. . |
| 4,376,956 | 3/1983 | Kelleher . |
| 4,479,159 | 10/1984 | Kamei et al. . |
| 4,541,022 | 9/1985 | Katsuyama . |
| 4,644,436 | 2/1987 | Unno . |
| 4,682,317 | 7/1987 | Tomisawa . |
| 4,703,465 | 10/1987 | Parker .................... 369/85 |
| 4,725,899 | 2/1988 | Gardner ................... 360/15 |
| 4,772,962 | 9/1988 | Tanaka et al. ............ 369/32 |
| 4,779,252 | 10/1988 | Custers et al. ........... 369/32 |
| 4,817,075 | 3/1989 | Kikuchi et al. ........... 369/47 |
| 4,841,503 | 6/1989 | Yamada et al. .......... 360/15 |
| 4,872,151 | 10/1989 | Smith ...................... 369/47 |
| 4,873,584 | 10/1989 | Hashimoto ............. 358/335 |

FOREIGN PATENT DOCUMENTS

| | | |
|---|---|---|
| 0275199 | 7/1988 | European Pat. Off. . |
| 0276143 | 7/1988 | European Pat. Off. . |
| 58-212686 | 12/1983 | Japan . |
| 58-212691 | 12/1983 | Japan . |
| 59-142789 | 8/1984 | Japan . |
| 60-263387 | 12/1985 | Japan . |
| 61-85671 | 5/1986 | Japan . |
| 61-283089 | 12/1986 | Japan . |
| 62-66491 | 3/1987 | Japan . |
| 62-134856 | 6/1987 | Japan . |

OTHER PUBLICATIONS

"NEC's CD-705E: Fully Loaded and Less Expensive", by Glenn A. Hart; Digital Audio, Feb. 1985; pp. 46 and 47.

*Primary Examiner*—Donald McElheny, Jr.
*Attorney, Agent, or Firm*—Wenderoth, Lind & Ponack

[57] ABSTRACT

A programming device of an optical disc reproducing apparatus is for programming a playing sequence of audio selections of an optical disc for recording onto a magnetic recording medium having first and second recording sides. An arithmetic unit is provided for determining which of the audio selections are to be recorded on each side of the magnetic recording medium in accordance with the recording time of the magnetic recording medium and the playing times of the audio selections, and for calculating remainder times denoting the difference between the recording time of the magnetic recording medium and the total playing times of the audio selections. A display device is provided, having first and second display regions, for display of index numbers of the audio selections to be recorded on the first side of the magnetic recording medium and the remainder time of the first side of the magnetic recording medium in the first region, and for display of index numbers of the audio selections to be recorded on the second side of the magnetic recording medium and the remainder time of the second side of the magnetic recording medium in the second region.

2 Claims, 6 Drawing Sheets

OPTICAL DISC REPRODUCING APPARATUS HAVING DISPLAY INDICATING PROGRAM STATUS

BACKGROUND OF THE INVENTION

The present invention generally relates to an optical disc reproducing apparatus of a compact disc player in which audio segments recorded on a compact disc are reproduced and recorded on another recording medium, such as a magnetic recording tape, having a first recording side A and a recording side B.

Conventionally, this type of optical disc reproducing apparatus is constructed as shown in FIG. 5 through FIG. 8 and includes a signal detection unit 1 composed of light pickup devices which read digitally encoded audio information (such as musical selections), playing time information and other table of contents (TOC) information recorded on an optical disc (hereinafter referred to as a disc), a signal output unit 2 which processes the digitally encoded audio information read by the signal detection unit 1 so as to convert such information into audio signals for outputting thereof, a control unit 3 for controlling the signal detection unit 1 and the signal output unit 2 and including an A/B recording side programming arithmetic unit 6 and an A/B recording side display control unit 7 (to be described hereinafter), a display unit 4 for displaying the playing time information, the programming information, and other information read by the signal detection unit 2 via the control unit 3, and a key switch unit 5. The key switch unit 5 includes a play key 5a for providing a playing start command to the control unit 3, a programming specification key 5b for specifying a programming operation, a recording time input key 5c for inputting a recording time period, an A/B recording side change-over key 5d for switching between an A side and a B side display, a program input key 5e for inputting an audio reservation for reserving an audio segment to be played, and a program deletion key 5f for deleting the audio reservation.

Figure 6:
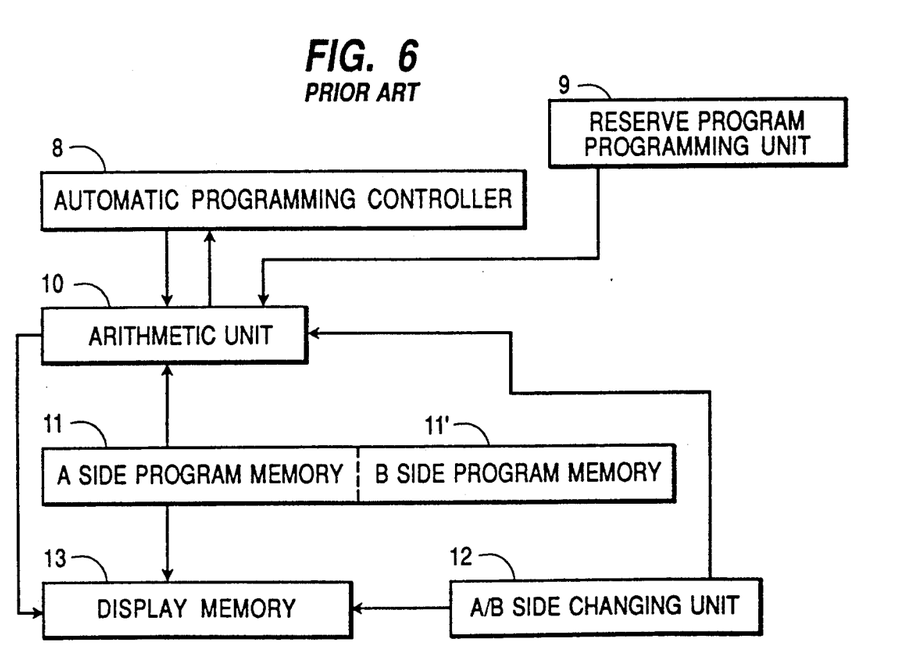
FIG. 6 is a block diagram of parts of the controller shown in FIG. 5.
Figure 7:
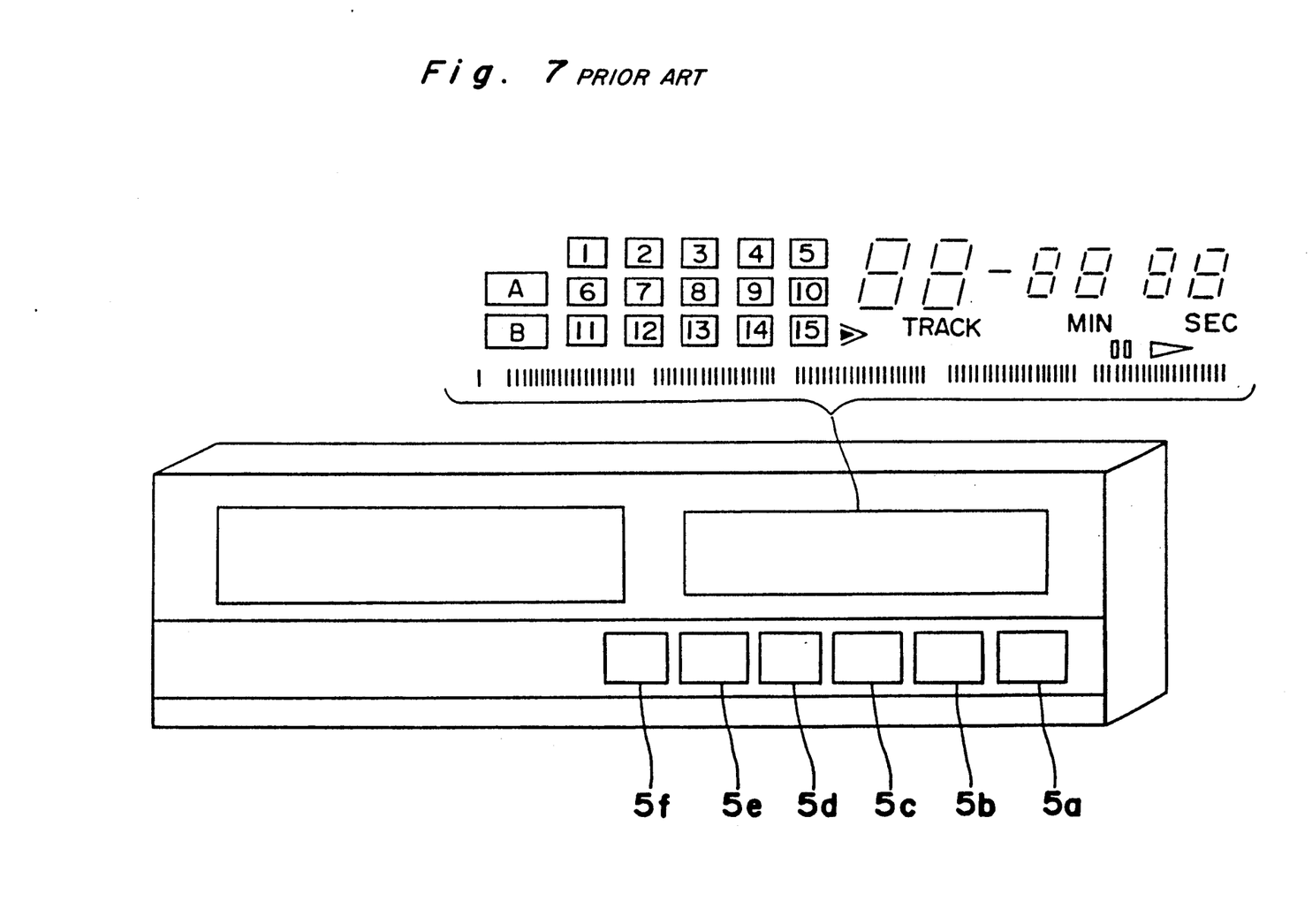
FIG. 7 is a perspective view of the apparatus shown in FIG. 5.

The A/B recording side arithmetic unit 6 and the A/B recording side display control unit 7 include an automatic programming control unit 8 for automatically establishing which of the musical selections of the disc may be recorded on the magnetic tape within the A side and B side recording time periods and for programming the play of such selections, a reserved music programming unit 9 for adding or deleting the reserved music selections when an optional manual programming mode is selected, an arithmetic unit 10 for obtaining the playing time periods of programmed music selections from the TOC information (wherein the index numbers of the music selections on the disc and the playing time periods of the music selections are recorded) detected by the signal detection unit 1 during programming and for calculating as a remaining time period the difference between the programmed playing time and the A and B side recording times, an A side music selection memory unit 11 for storing programmed music selections to be recorded on the A side during or after the operation, a B music selection memory unit 11' for similarly storing programmed music selections to be recorded on the B side, a display information memory unit 13 for storing as display information the remaining time period calculated by the arithmetic unit 10, the index numbers of the music selections and the information stored in the A side music selection memory unit 11 or the B side music selection unit 11', and an A/B change-over unit 12 for switching the information stored in the the display information memory unit 13.

Figure 8:
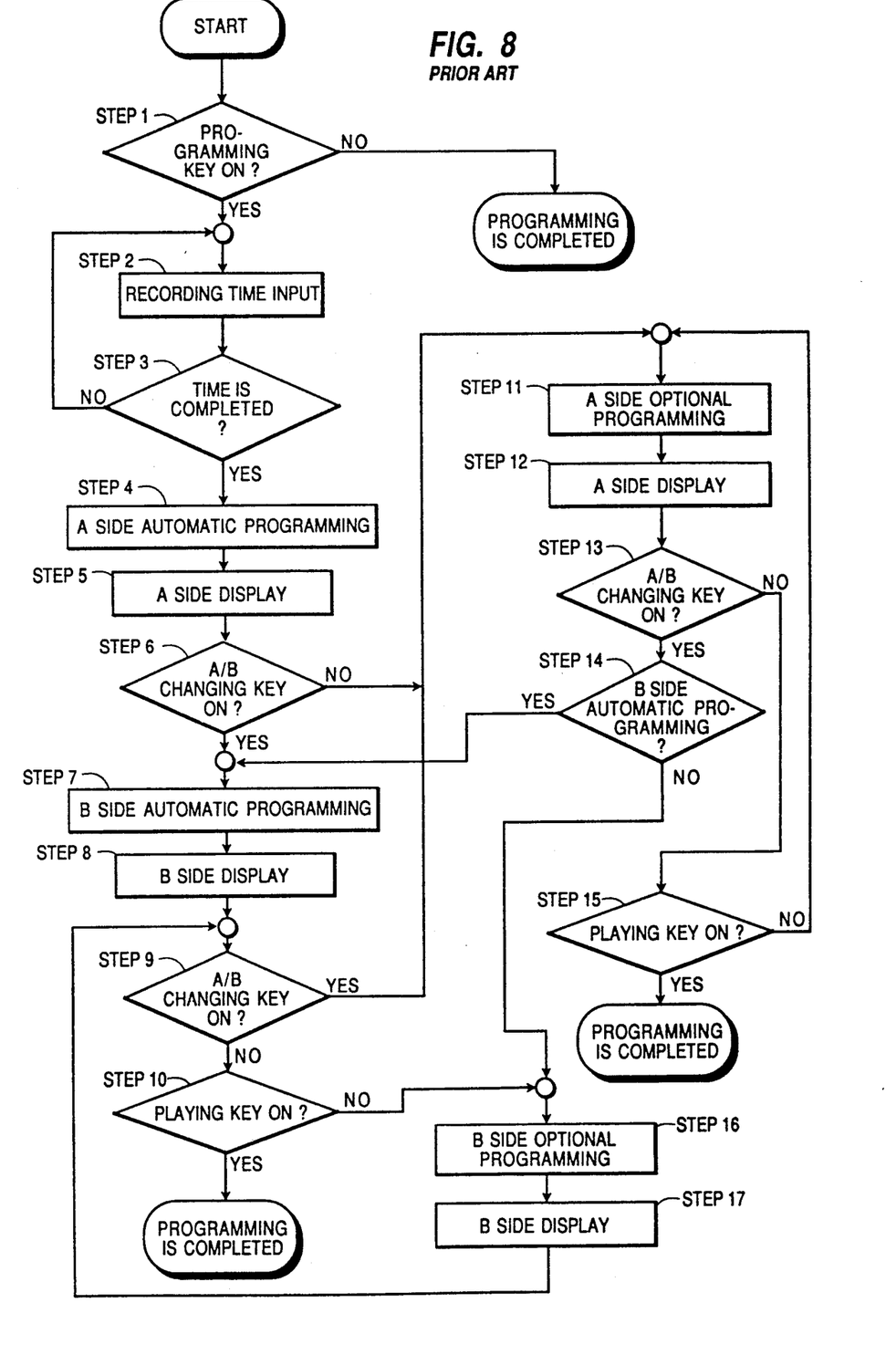
FIG. 8 is an operational flow-chart of the apparatus shown in FIG. 5.

The control operation is shown in the flow-chart of FIG. 8 and is effected through the above-described construction.

At step 1, it is judged whether or not a programming specification key 5b has been depressed. The control proceeds to step 2 if the key 5b has been depressed. If the key 5b has not been depressed, the programming is completed. At step 2, the inputting of the recording time period is received by the recording time input key 5c. At step 3, it is judged whether or not the inputting operation of the recording time period has been completed. When it has been completed, the control proceeds to step 4. When it has not been completed, the control returns to step 2 so as to repeat steps 2 and 3 until the inputting of the recording time period is completed. At step 4, the music selections which may be recorded on the A side are calculated by the automatic programming control unit 8 and the arithmetic unit 10 based on the inputted recording time period and such music selections are stored in the A side music selection memory unit 11. At step 5, the A side music selections obtained during the automatic programming, the index numbers there or, the remaining time period and so on are stored as the display information in the display information memory unit 13 for displaying thereof by the display unit 4. At step 6, it is judged whether or not the A/B change-over key 5d has been depressed. When the key 5d has been depressed, the control proceeds to step 7. When it has not been depressed, the control proceeds to step 11. At step 7, the automatic programming operation for the B side is effected in the same manner as that of the A side in step 4. At step 8, the display information memory unit 13 is loaded with the B side programming information for displaying thereof by the display unit 4. At step 9, it is judged whether or not the A/B change-over key 5d has been depressed again. When the key 5d has been depressed, the control proceeds to step 11. When it has not been depressed, the control proceeds to 10. At the step 10, it is judged whether or not the play key 5a has been depressed. When it has not been depressed, the control proceeds to step 16. When it has been depressed, the programming processing is completed. At step 11, with the A side display, the input of the program input key 5e and the program deletion key 5f are received for programming of the optional music selections manually on the A side. A calculation is effected by the programming arithmetic unit 10 regarding the A side music selections programmed as such.

At step 12, the A side programmed information obtained at step 11 is stored in the display information memory unit 13 for display by the display unit 4.

At step 13, it is judged whether or not the A/B change-over key 5d has been depressed. When the key 5d has been depressed, the control proceeds to 14. When it has not been depressed, the control proceeds to step 15. At step 14, it is judged whether or not the automatic programming for the B side has been completed. When the programming has been completed, the control proceeds to step 16. When it has not been completed, the control goes to step 7 so as to effect the automatic programming for the B side. At step 15, it is judged whether or not the play key 5a has been depressed. When the key 5a has been depressed, the programming is completed. When the key 5a has not been depressed, the control returns to step 11 so as to continue the optional programming operation of the A side. At step 16, as with the B side display at step 11, the optional programming of the B side is received and the calculating operation is effected regarding the B side music selections by the programming arithmetic unit 10. At step 17, the B side programming information obtained at step 16 is stored in the display information memory unit 13 for display by the display unit 4, and the control returns to step 9. The above arrangement is disclosed, for example, in Japanese Patent Laid-Open Publication No. 173291/1988, No. 173292/1988 and No. 179483/1988, which are issued July 16, 1988, July 16, 1988 and July 23, 1988, respectively (counterpart U.S. application Ser. No. 128911, based on first two Japanese applications, and No. 128912; and counterpart EP Application No. 88300276.8, based on first two Japanese applications, and No. 88300461.6).

However, in the above-described conventional construction, the programming information for the A side and the B side cannot be displayed at the same time, since the display unit for displaying the programming information provides for the display of only one. Accordingly, in order to add onto one side of the tape a music selection not programmed for the other side or to delete such a music selection to accommodate the remaining time period on the other side, it is necessary to effect extremely complicated programming operations in which the display is switched over by the A/B side change-over key to display the programmed information on one side so that the operator might memorize such information, and the display is then switched over again to effect the programming of the other side.

SUMMARY OF THE INVENTION

Accordingly, an object of the present invention is to provide an optical disc reproducing apparatus which is capable of displaying the programming information of the A side and the B side simultaneously.

In accomplishing the above object, according to the embodiment of the present invention, there is provided an optical disc reproducing apparatus which includes a signal detection unit for detecting the audio information, the TOC information and so on recorded on a disc, an automatic programming control unit for automatically establishing the playing of music selections of the disc which may be played within the recording time periods of the A side and B side of the tape when such information on the disc is recorded on a magnetic recording tape or the like, a reserved programming unit for adding or deleting the music selections when the music selections are manually programmed in an optional order, a programming arithmetic unit for obtaining the playing time periods of the music selections from the TOC information detected by the signal detection unit and for calculating as a remaining time period the difference between the playing time and the recording time, an A side music selection memory unit for storing the music selections recorded on the A side during or after programming, a B side music selection memory unit for similarly storing the programmed music selections recorded the B side, an A/B change-over unit for switching over the programming side, an A side display information memory unit for storing as A side display information the remaining time and the index numbers of the music selections obtained by the programming arithmetic unit and other information stored in the A side music selection memory unit, a B side display information memory unit for similarly storing the display information of the B side, an A side display unit for displaying the A side display information, and a B side display unit for displaying the B side display information.

The programming information of the A side and the B side calculated during the record programming of the disc are respectively stored in the A side information memory unit and the B side information memory unit. Such information are displayed by the A side display unit and the B side display unit, so that the display may be effected simultaneously of the A side and the B side. Therefore, the programming may be effected with regard to the information of the other side without the necessity of the complicated operations carried out when the programming is effected using the display of information of one side only.

BRIEF DESCRIPTION OF THE DRAWINGS

These and other objects and features of the present invention will become clear from the following description taken in conjunction with the preferred embodiment thereof with reference to the accompanying drawings, in which.

DETAILED DESCRIPTION OF THE INVENTION

It is noted that like parts are designated by like reference numerals throughout the accompanying drawings.

Figure 1:
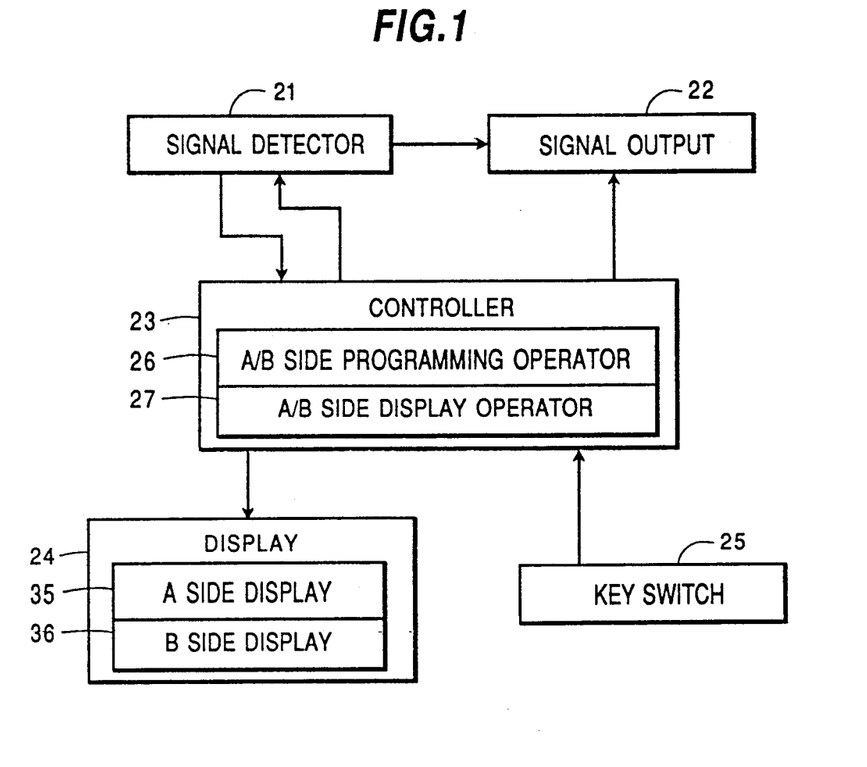
FIG. 1 is a block diagram of an optical disc reproducing apparatus in one embodiment of the present invention.
Figure 2:
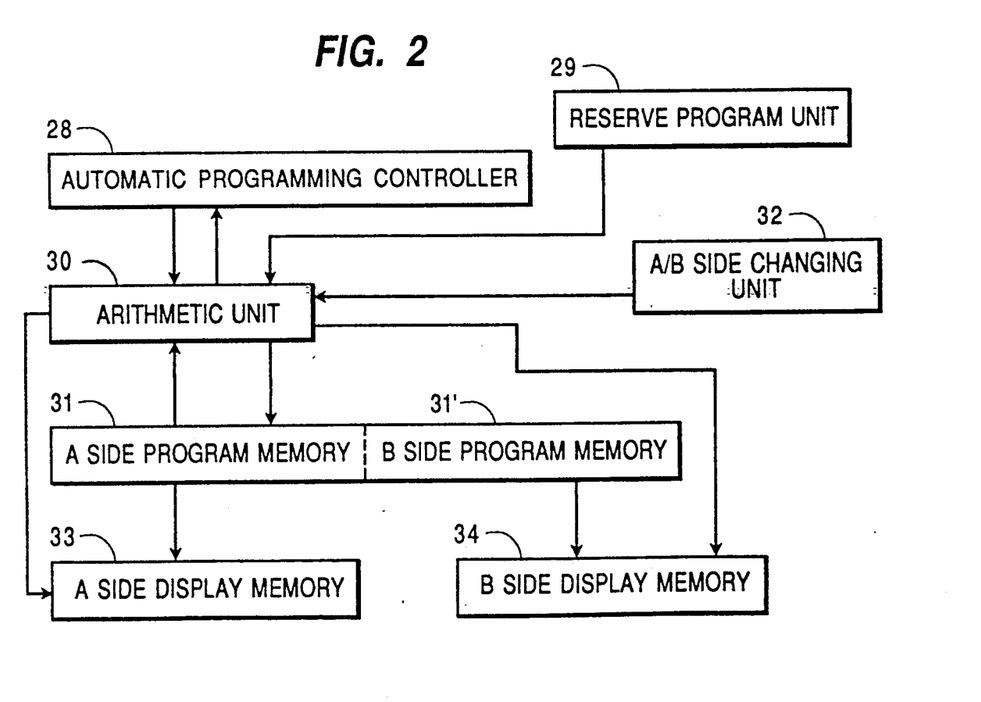
FIG. 2 is a block diagram of parts of the controller shown in FIG. 1.
Figure 3:
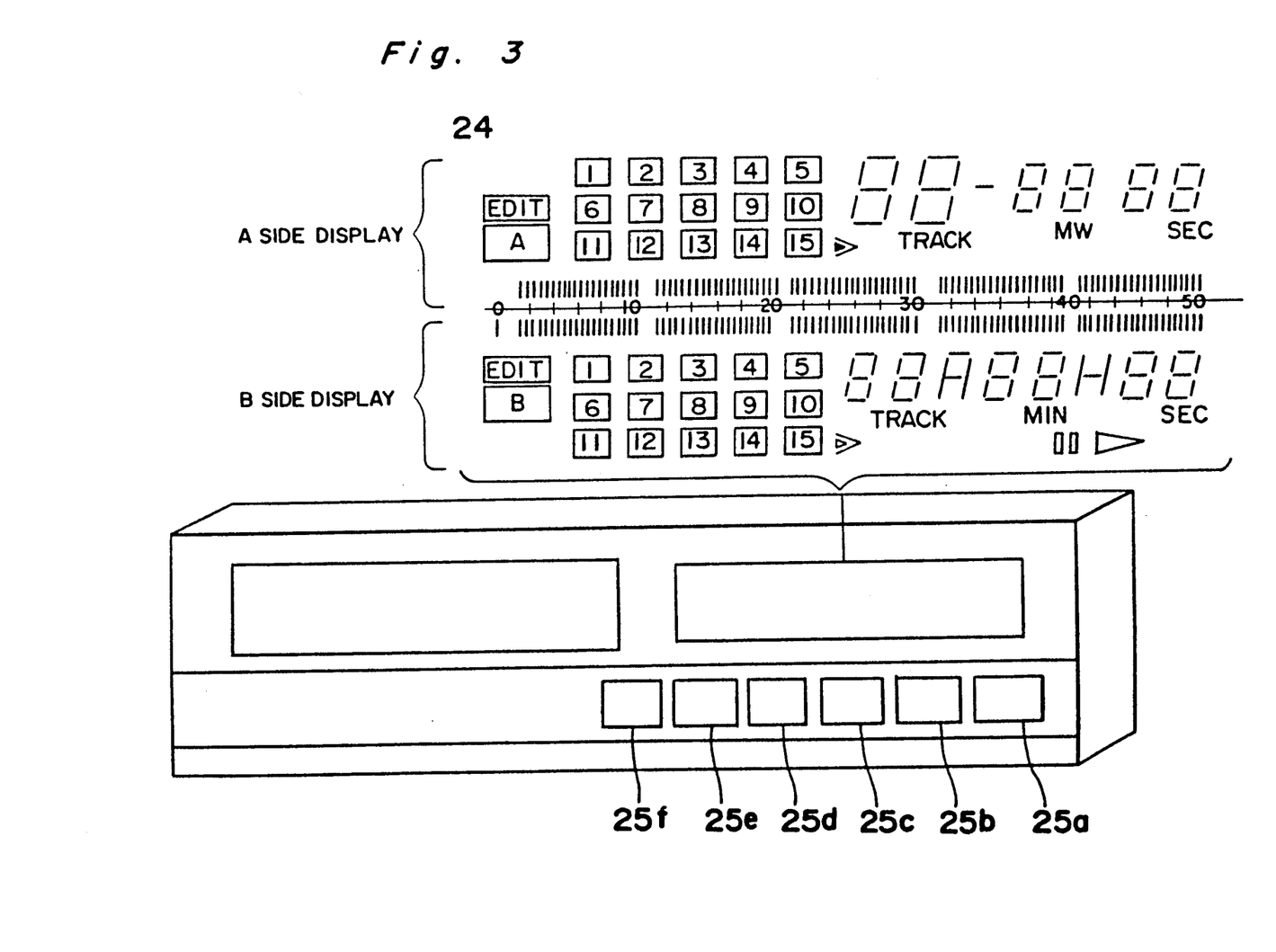
FIG. 3 is a perspective view of the apparatus shown in FIG. 1.

Referring now to FIG. 1 and FIG. 2, an optical disc reproducing apparatus according to an embodiment of the present invention includes a signal detection unit 21 and a signal output unit 22 each functioning as in the conventional apparatus, a control unit 23 for controlling the signal detection unit 21 and the signal output unit 22 and including an A/B side arithmetic unit 26 and an A/B side display control unit 27 (to be described hereinafter), a display unit 24 for displaying the playing time and programming information and including an A side display unit 35 and a B side display unit 36, and a key switch unit 25. As shown in FIG. 3, the key switch unit 25 includes a play key 25a for providing a playing start command to the control unit 23, a programming specification key 25b for specifying a programming operation, a recording time input key 25c for inputting a recording time period, an A/B change-over key 25d for changing between recording sides, a program input key 25e for inputting a music selection reservation for reserving a music selection to be played, and a program deletion key 25f for deleting the reservation. The A/B side arithmetic unit 26 and the A/B side display control unit 27 include an automatic programming control unit 28 functioning as that of the conventional apparatus, a reserved selection programming unit 29, an arithmetic unit 30, an A side music selection memory unit 31 and a B side music selection unit 31', a A/B change-over unit 32 for changing recording sides, an A side display information memory unit 33 for storing as the A side display unit information A side information of the remaining time and the index numbers of the music selections obtained by the arithmetic unit 30 and other information stored in the A side music memory unit 31, and a B side display information memory unit 34 for similarly storing information regarding the B side.

The operation of the present invention will be described with reference to the flow chart of FIG. 4.

Figure 4:
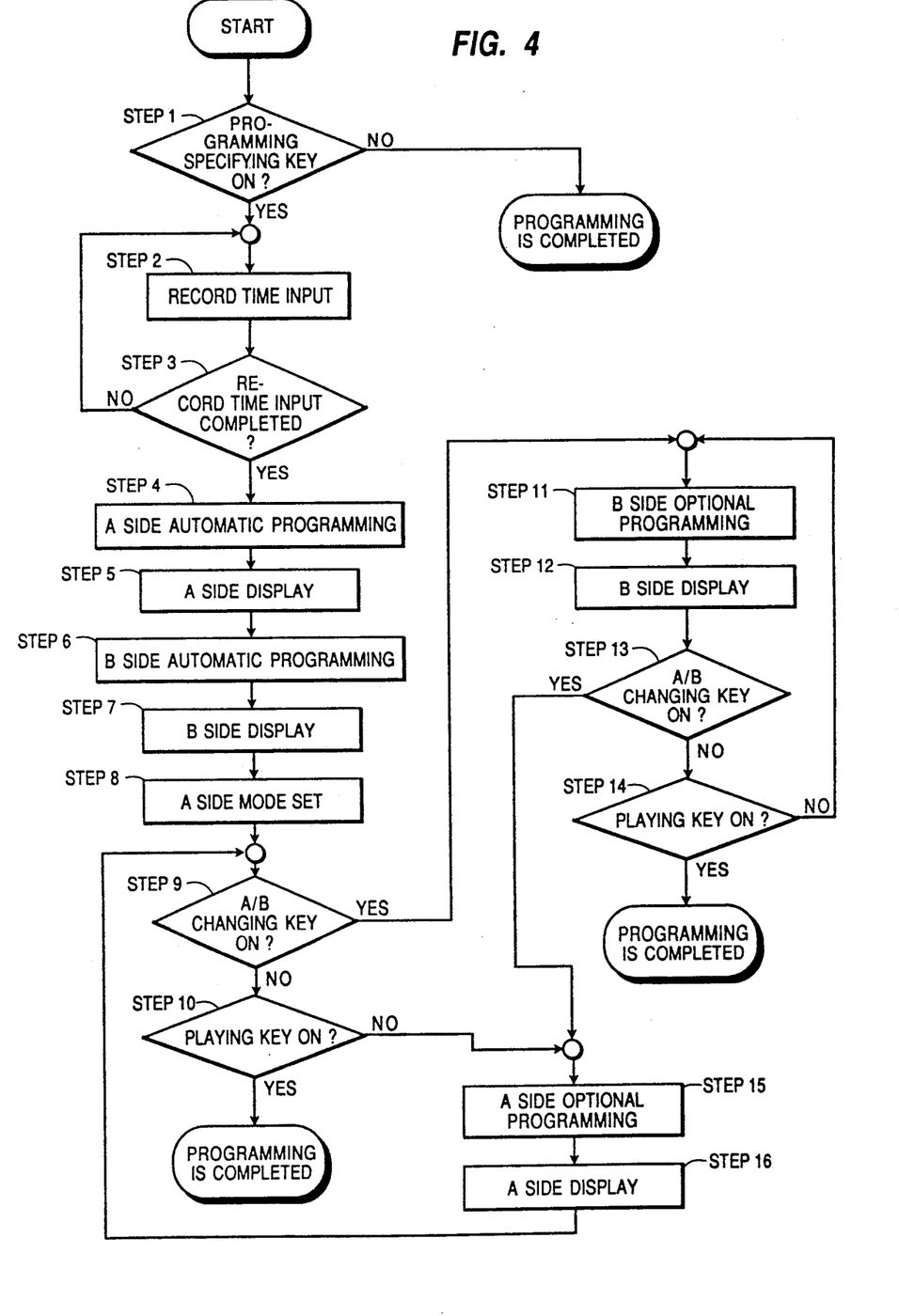
FIG. 4 is an operational flow-chart of the apparatus shown in FIG. 1.
Figure 5:
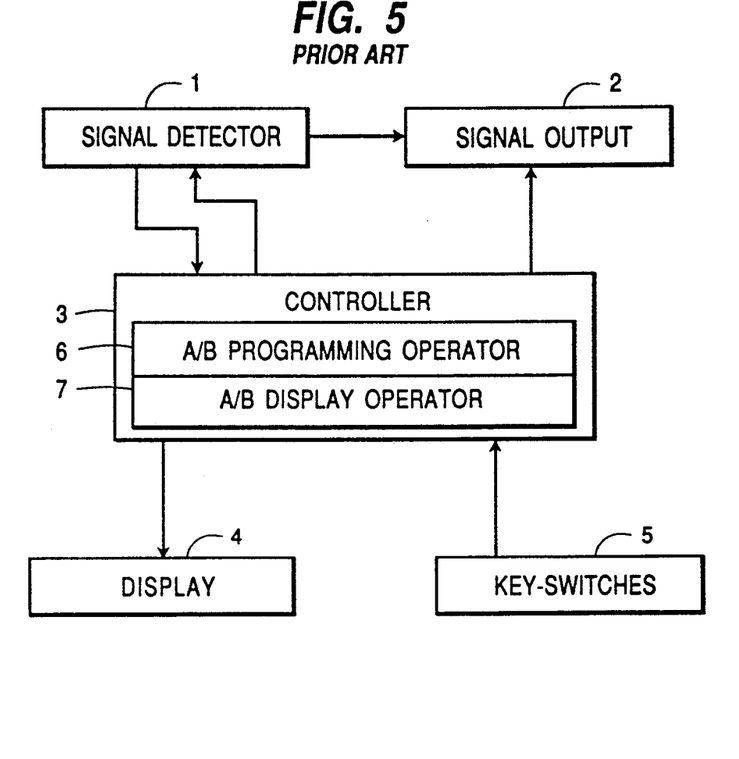
FIG. 5 is a block diagram of the conventional apparatus.

Referring to FIG. 4, steps 1 through 4 are the same as those of the conventional apparatus, and the description thereof is omitted. At step 5, the A side programming information including the A side music selection obtained during automatic programming, the index numbers thereof, and the remaining time period or the like, is stored as the display information in the A side display information memory unit 33, and is displayed by the A side display unit 35. At step 6, the automatic programming for the B side is effected in the same manner as in the A side at step 4. At step 7, the B side programming information is stored as the display information in the B side display information memory unit 34 and is displayed by the B side display unit 36 at step 5. In this state, the programming information of the A side and the B side are displayed at the same time. At step 8, the A mode is established in which any subsequent operation of the reserved music selection programming unit 29 will be with respect to the A side. At step 9, it is judged whether or not the A/B change-over key 25d has been depressed. When it has been depressed, the B mode is established, and the control proceeds to step 11. When it has not been depressed, the control proceeds to step 10. At step 10, it is judged whether or not the play key 25a has been depressed. When it has not been depressed, the control proceeds to step 15. When it has been depressed, the programming is completed. At step 11, the depressing of the program unit key 25e and the program deletion key 25f are detected to provide for manual programming of the music selections in an optional order on the B side. Calculations are effected by the arithmetic unit 30 regarding the B side music selections programmed through such inputs.

At step 12, the B side programming information obtained at step 11 is stored in the B side display information memory unit 34 for display by the B side display unit 36. At this time, since the A side programming information of the A side display information memory unit 33 has not changed, the A side display unit 35 continues its display as is. At step 13, it is judged whether or not the A/B change-over key 25d has been depressed again. When it has been depressed, the A mode is established, and the control proceeds to step 15. When it has not been depressed, the control proceeds to step 14.

At step 14, it is judged whether or not the play key 25a has been depressed. When it has not been depressed, the control returns to step 11 to continue the optional programming of the B side. When is has been depressed, the programming process is completed. At step 15, the optional programming of the A side is carried out as with the B side in step 11, so that a calculation is effected regarding the A face programmed music selections by the arithmetic unit 30. At step 16, the A side programming information obtained at step 15 is stored in the A side display information memory unit 33 for display by the A side display unit 35 and the control returns to step 9.

According to the present embodiment, during the second programming operation of the playing of the disc, the A side programming information is stored in the A side display information memory unit 33 for display on the A side display unit 35. Furthermore, the B side programming information is stored in the B side display information memory unit 34 for on the B side display unit 36, whereby the programming information for the A side and B side may be simultaneously displayed.

As is clear from the foregoing description, the present invention includes a signal detection unit for detecting the audio information and TOC information and other information recorded on a disc, an automatic programming control unit for automatically programming the playing of music selections that may be played within the A side and B side recording time periods of a magnetic recording tape or the like, a reserved programming unit for adding or deleting music selections when the music selections are programmed manually to be played in an optional order, an arithmetic unit for obtaining the playing time periods of the music selections using the TOC information detected by the signal detection unit and for calculating as the remaining time period the difference between the playing time and the recording time period, an A side music selection memory unit for storing the music selections to be recorded on the A side, a B side music selection memory unit for similarly storing the music selections to be recorded on the B side, an A/B change-over unit for changing over the programming between recording sides, an A side display information memory unit for storing the A side display information including the A side programming information of the remaining time obtained by the editing arithmetic unit and the index numbers of the music selections and other information stored in the A side music selection memory unit, a B side display information memory unit for similarly storing the programming information of the B side, an A side display unit for displaying the A side display information and a B side display unit for displaying the B side display information, whereby the A side and the B side programming information are simultaneously displayed.

Although the present invention has been fully described by way of example with reference to the accompanying drawings, it is noted that various changes and modifications will be apparent to those skilled in the art. Therefore, unless otherwise such changes and modifications depart from the scope of the present invention, they should be construed as included therein.

What is claimed is:

1. A programming device of an optical disc reproducing apparatus, the optical disc reproducing apparatus for reproducing recorded information recorded on an optical disc, the recorded information including a plurality of discrete audio selections and index numbers identifying each of the plurality of discrete audio selections and playing time information indicating the playing time of each of the plurality of discrete audio selections, the programming device for programming the playing sequence of the plurality of discrete audio selections for recording onto a magnetic recording medium having first and second recording sides, said programming device comprising:

signal detection means for detecting the recording information recorded on the optical disc;

recording time input means for inputting of a recording time of the magnetic recording medium;

recording the memory means, coupled to said recording time input means, for storing the recording time of the magnetic recording medium;

arithmetic means, coupled to said signal detecting means and said recording time memory means, for determining which of the discrete audio selections are to be recorded on each of the first and second recording sides of the magnetic tape in accordance with the recording time of the magnetic tape and the playing time information of the discrete audio selections, and for calculating respectively for each of the first and second recording sides of the magnetic tape first and second remainder times denoting a difference between the recording time of the first and second recording sides and a total of the playing times of the discrete audio selections to be recorded on the first and second recording sides;

a first side audio selection memory means, coupled to said arithmetic means, for storing the index numbers of the discrete audio selections determined by said arithmetic means to be recorded on the first side of the magnetic recording medium;

a second side audio selection memory means, coupled to said arithmetic means, for storing the index numbers of the discrete audio selections determined by said arithmetic means to be recorded on the second side of the magnetic medium;

a first side display memory means, coupled to said arithmetic means and said first audio selection memory means, for storing as first side display information at least one of the first remainder time calculated by said arithmetic means and the index numbers stored in said first side audio selection memory means;

a second side display memory means, coupled to said arithmetic means and said second audio selection memory means, for storing as second side display information at least one of the second remainder time calculated by said arithmetic means and the index numbers stored in said second side audio selection memory means; and, a display means, having a first display region and a second display region and coupled to said first and second side display memory means, for displaying in said first display region the first side display information stored in said first side display memory means and for displaying in said second display region the second side display information stored in said second side display memory means.

2. A programming device of an optical disc reproducing apparatus as recited in claim 1, further comprising:

audio selection deletion inputting means, coupled to said first and second side audio selection memory means, for inputting of an index number of a discrete audio selection to be deleted from one of said first side audio selection memory means and said second side audio selection memory means; and, audio selection addition inputting means, coupled to said first and second side audio selection memory means, for inputting of an index number of a discrete audio selection to be added to one of said first side audio selection memory means and said second side audio selection memory means;

wherein said arithmetic means includes means for recalculating the first and second remainder times upon at least one of an addition and a deletion of a discrete audio selection stored in at least one of said first and second side audio selection means, and wherein the thus recalculated first and second remainder times are stored in said first and second side display memory means respectively.

* * * * *